United States Patent [19]
Kobayashi

[11] Patent Number: 6,067,450
[45] Date of Patent: May 23, 2000

[54] PAGER ELIMINATING INTERMODULATION

[75] Inventor: Yasuhiro Kobayashi, Shizuoka, Japan

[73] Assignee: NEC Corporation, Tokyo, Japan

[21] Appl. No.: 08/896,905

[22] Filed: Jul. 18, 1997

[30] Foreign Application Priority Data

Jul. 26, 1996 [JP] Japan .................................. 8-197513

[51] Int. Cl.⁷ .................................................. H04B 1/06
[52] U.S. Cl. ..................... 455/277.2; 455/38.3; 455/574; 455/226.3
[58] Field of Search .................................. 455/132, 133, 455/135, 272, 277.1, 277.2, 226.1, 226.3, 373, 574, 38.1, 38.3

[56] References Cited

U.S. PATENT DOCUMENTS

| | | | |
|---|---|---|---|
| 5,001,776 | 3/1991 | Clark ........................................ | 455/226 |
| 5,406,613 | 4/1995 | Peponides et al. ....................... | 455/574 |
| 5,862,465 | 1/1999 | Ou ........................................... | 455/234.1 |

FOREIGN PATENT DOCUMENTS 5-235828 9/1993 Japan .
10-13896 1/1998 Japan .

*Primary Examiner*—Paul Loomis
*Attorney, Agent, or Firm*—Sughrue, Mion, Zinn, Macpeak & Seas, PLLC

[57] ABSTRACT

A pager includes a power supply that supplies a plurality of power sources of various voltages, a switch that selects a power source supplied by the power supply and supplies the power source to a frequency converter, and a controller that shifts the selection of the switch into another power source of higher voltage when extraction of an ID from a signal demodulated by a demodulator is impossible. The controller instructs the switch to select a power source of the lowest voltage in the initial state and after a predetermined time from the switching into the higher voltage power source. Signal distortion in the frequency converter, a factor causing intermodulation, is prevented by switching the power source voltage of the frequency converter. Deterioration of the possibility of reception due to intermodulation in the frequency converter is thereby prevented. The switch is returned to its initial state after a predetermined time and power consumption of the pager is reduced. The possibility of reception is improved even more if an attenuator is provided in front of an amplifier.

8 Claims, 6 Drawing Sheets

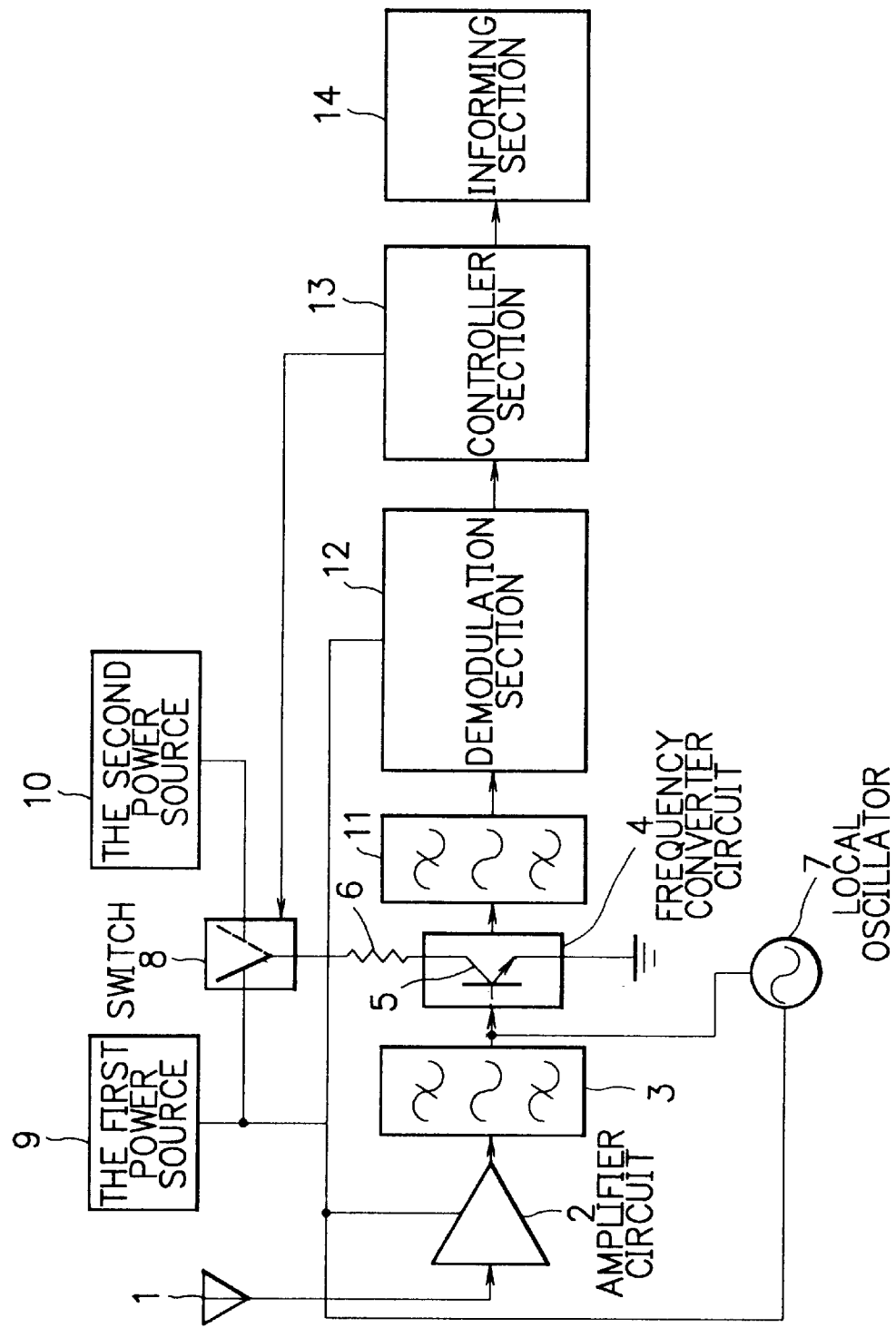

PAGER ELIMINATING INTERMODULATION

BACKGROUND OF THE INVENTION

The present invention relates to a pager, and in particular, to improvement of reception possibility of the pager by eliminating intermodulation of signals.

DESCRIPTION OF THE PRIOR ART

Various kinds of pagers for receiving radio selective calling are put on the market and the number of subscribers of radio selective calling service is remarkably increasing. The number of frequencies used for the service is thereby increasing acceleratively and in such circumstances where a lot of adjacent frequencies exist, reception possibility of the pager is deteriorated by intermodulation or interference of radio waves. Therefore, there have been provided some kinds of pagers designed in order to eliminate the above intermodulation problem.

FIG. 1 exemplarily shows construction of a conventional pager which is disclosed in Japanese Patent Laid-Open Publication No.5-235828. The pager comprises a receiver section 106, a controller section 107, and an informing section 108. The receiver section 106 includes an antenna 101 for receiving radio signals, an attenuator circuit 102 for controlling or attenuating the amplitude (reception gain) of the radio signals received by the antenna 101, an amplifier circuit 103 for amplifying the radio signals, a frequency converter circuit 104 for converting the frequency of the radio signals sent from the amplifier circuit 103 into an intermediate frequency, and a demodulation section 105 for demodulating the signals sent from the frequency converter circuit 104. The controller section 107 extracts ID(address) information from the signal demodulated by the receiver section 106. The informing section 108 informs the user of reception of calling according to an instruction from the controller section 107.

In the conventional pager, in order to eliminate intermodulation from inputted radio signal and improve the possibility of reception, the amplitude of the radio signal after being received by the antenna 101 is controlled or attenuated by the attenuator circuit 102 before being inputted into the amplifier circuit 103.

FIGS. 2A and 2B show elimination of unnecessary waves by the attenuator circuit 102 in the conventional pager. As shown in FIG. 2A, in the case where unnecessary waves exist adjacent to the wave to be received i.e. the necessary wave, interfering components of the unnecessary waves are included in the frequency range of the necessary wave, and intermodulation occurs at reception gain α. However, the electric field levels of the interfering components of the unnecessary waves are lower than the level of the necessary wave. Therefore, the reception gain is reduced to β by attenuation of the attenuator circuit 102, and the levels of the interfering components of the adjacent unnecessary waves become out of the range of receivable gain and eliminated. In this way, the electric field level of the adjacent unnecessary waves to which the intermodulation can be avoided is raised.

However, in the afore-mentioned conventional pager, the amount of attenuation by one attenuator circuit 102 is limited, and when a strong interfering electric field is inputted and the attenuation is not sufficient, the possibility of reception may be reduced by intermodulation.

Moreover, semiconductor devices used in the frequency converter circuit 104 are generally provided with a power source of fixed and low voltage (about 1V). In the case where the power source voltage of the frequency converter circuit 104 is low and input level of radio signals is high, signal distortion which causes intermodulation may easily occur in the frequency converter circuit 104. Therefore, in conventional pagers, intermodulation may easily occur according to high level input signals and the intermodulation may lower the possibility of reception.

SUMMARY OF THE INVENTION

It is therefore the primary object of the present invention to provide a pager which can prevent signal distortion in the frequency converter circuit and eliminate intermodulation, and thereby increase the possibility of reception.

Another object of the present invention is to provide a pager which can save power consumption along with preventing deterioration of reception possibility due to intermodulation.

In accordance with the present invention, there is provided a pager comprising a power supply means for supplying plural power sources of various voltages, a switching means for selecting a power source supplied by the power supply means and supplying the power source to a frequency converter means, and a controller means for shifting the selection of the switching means into another power source of higher voltage when extraction of an ID from a signal demodulated by a demodulation section is impossible.

In accordance with one aspect of the present invention, the controller means may instruct the switching means to select a power source of the lowest voltage in the initial state and after a predeterimined time from the switching into higher voltage power source.

In accordance with another aspect of the present invention, the controller means may instruct the switching means to select a power source of lower voltage as long as the extraction of an ID from the demodulated signal is possible.

In accordance with another aspect of the present invention, there is provided a pager further comprising an attenuator means which is capable of attenuating reception gain in front of an amplifier means when extraction of an ID from the demodulated signal is impossible.

BRIEF DESCRIPTION OF THE DRAWINGS

The objects and features of the present invention will become more apparent from the consideration of the following detailed description taken in conjunction with the accompanying drawings, in which:

FIG. 3 is a block diagram of an embodiment of the present invention;

DESCRIPTION OF THE PREFERRED EMBODIMENTS

Figure 1:
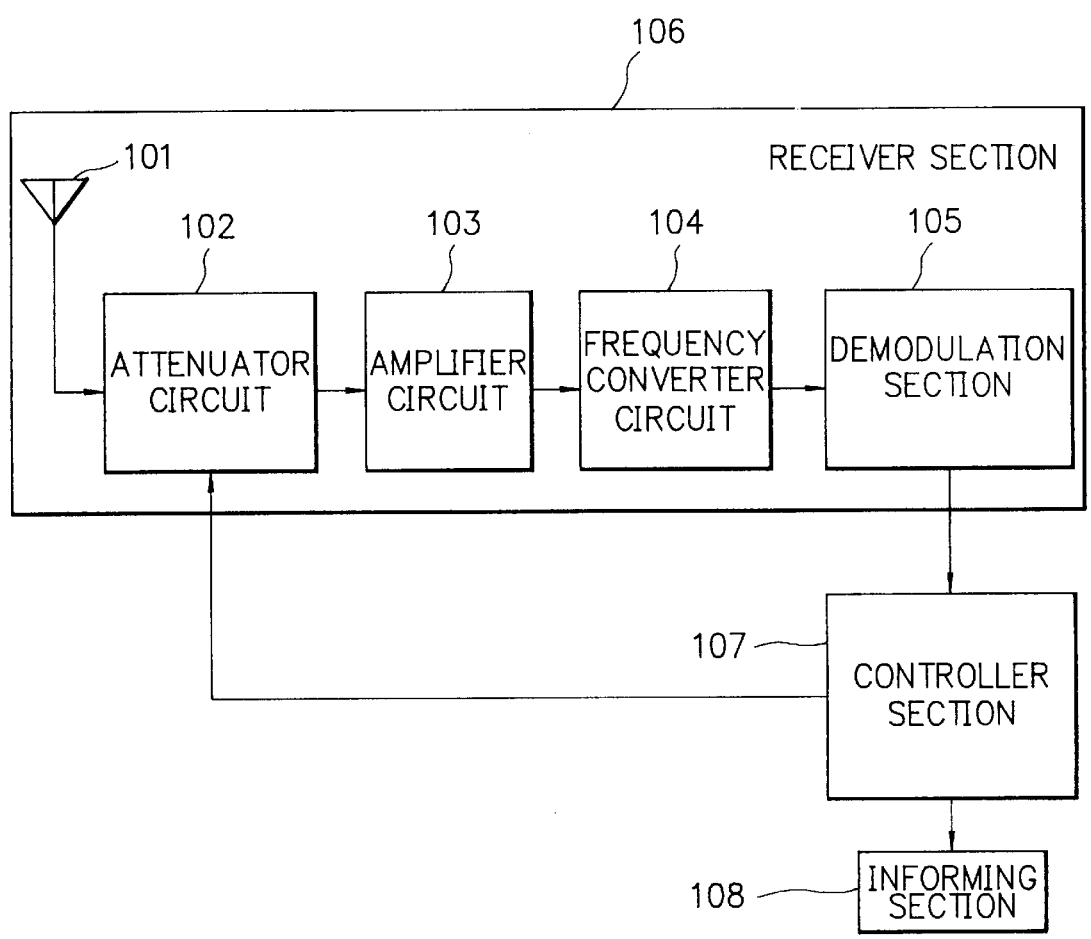
FIG. 1 is a schematic block diagram of a conventional pager.
Figure 2A:
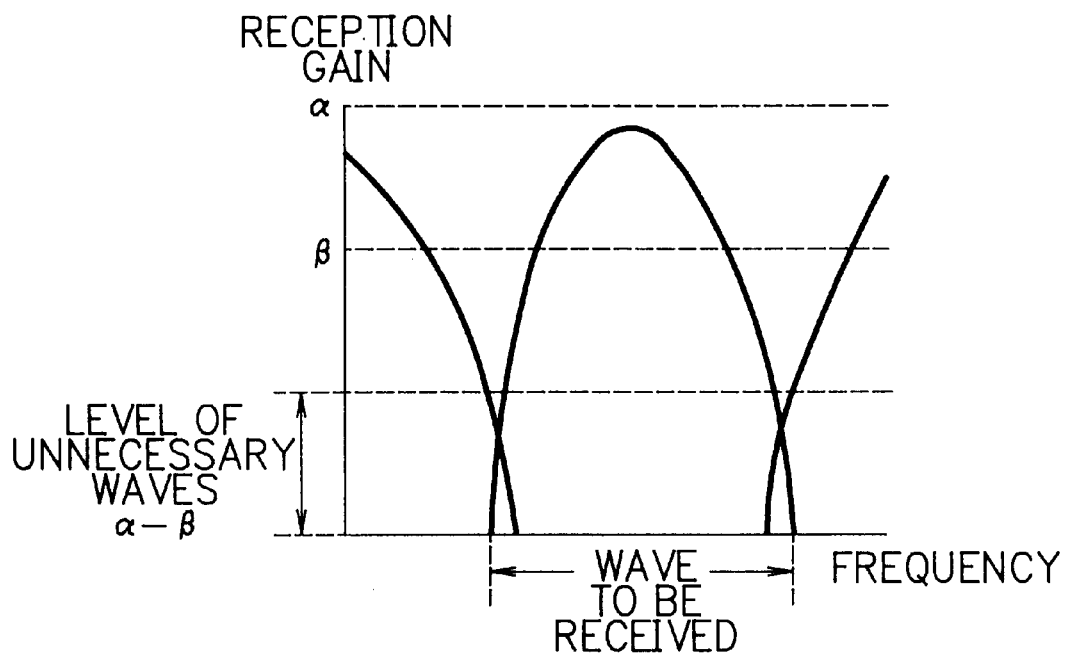
FIGS. 2A and 2B are graphical representations showing elimination of unnecessary waves by an attenuator circuit in a conventional pager.
Figure 2B:
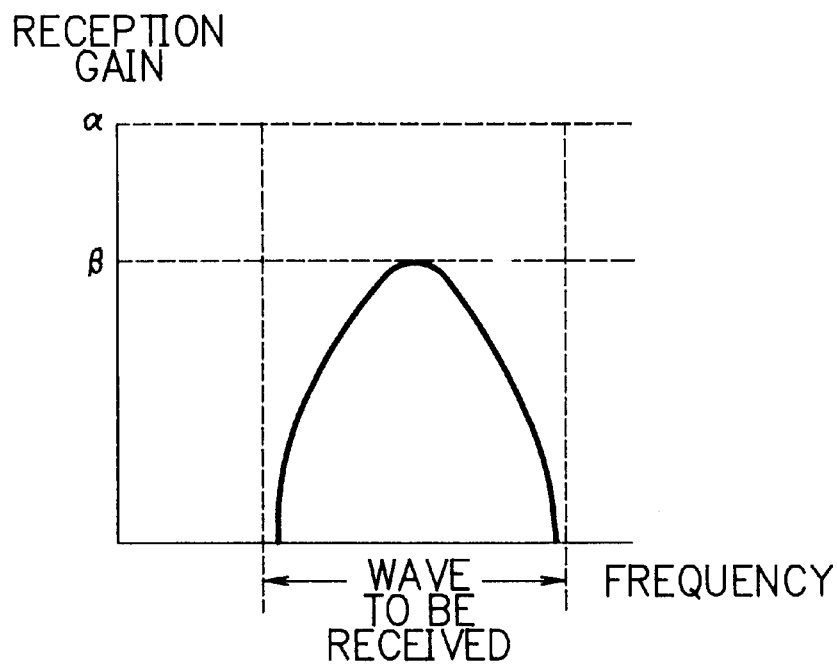

Referring now to the drawings, a description will be given in detail of a method and an apparatus in accordance with the present invention.

FIG. 3 shows construction of a pager according to an embodiment of the present invention. The pager comprises an antenna 1, an amplifier circuit 2, the first filter 3, a frequency converter circuit 4, a transistor 5 for the frequency converter circuit 4, a resistor 6, a local oscillator 7, a switch 8, the first power source 9, the second power source 10, the second filter 11, a demodulation section 12, a controller section 13, and an informing section 14.

In the pager shown in FIG. 3, a radio signal received by the antenna 1 is inputted into the amplifier circuit 2 for executing high frequency amplification. The amplified radio signal passes through the first filter 3 for passing an arbitrary band, and is inputted into the frequency converter circuit 4 for converting the frequency of the radio signal into an intermediate frequency according to the output of the local oscillator 7. The output of the frequency converter circuit 4 is sent to the demodulation section 12 via the second filter 11 for passing an arbitrary band, and is demodulated into a baseband signal. The demodulated baseband signal is then inputted into the controller section 13. The controller section 13 extracts ID(address) information from the baseband signal and judges whether or not the ID in the signal is the ID of the pager itself. If the ID corresponds to the ID of the pager, the controller section 13 sends an instruction to the informing section 14 and the informing section 14 informs the user of reception of calling by means of a speaker, LED, vibrator, etc..

In this embodiment, two power sources 9 and 10 of different voltages (for example, 1V and 3V) are provided, and the transistor 5 is used in the frequency converter circuit 4. The collector of the transistor 5 is connected via the resistor 6 to either the power sources 9 or the power sources 10 by the switch 8. The operation of the switch 8 is controlled by control signals of the controller section 13 and the connection between the frequency converter circuit 4 and the power source 9 or 10 is switched.

In the following, the operation of this embodiment will be described in detail.

Usually, the switch 8 is set on the side of the first power source 9 which has lower power source voltage (1V) for the frequency converter circuit 4, and the power consumption is thereby reduced. If the electric field level of received radio wave is high, signal distortion may occur in the transistor 5 of the frequency converter circuit 4 and unnecessary components due to the interfering wave may be included in the output of the frequency converter circuit 4.

When the controller section 13 judged that a necessary signal is suppressed by the unnessasary components and reception of a calling signal (or extraction of an ID) is impossible, the controller section 13 sends a control signal to the switch 8 and the switch 8 is switched to the side of the second power source 10, thereby the frequency converter circuit 4 is connected to the second power source 10 of higher power source voltage (3V). By this switching into higher voltage power source, the bias of the transistor 5 is set capable of avoiding the signal distortion despite the high level input into the frequency converter circuit 4, thereby reception of a calling signal is made possible.

The controller section 13 keeps the position of the switch for a predetermined time, and then send another control signal to the switch 8 to return to the side of the first power source 9. This switching back is executed in order to save the power consumption of the pager by reducing the power source voltage of the frequency converter circuit 4 after the predetermined time.

Figure 4:
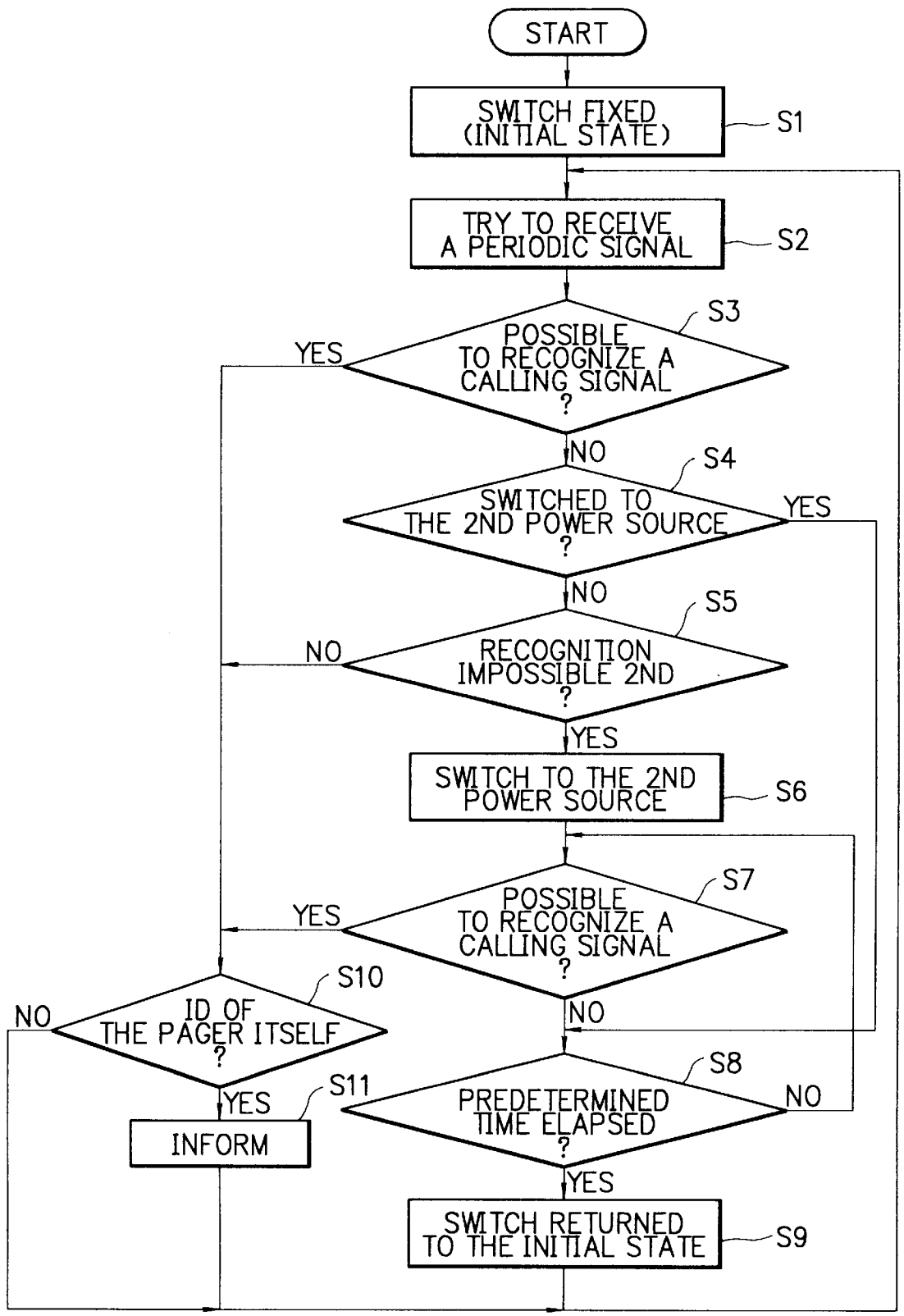
FIG. 4 is a flow sheet showing the operation of an embodiment of the present invention.

Referring now to a flow sheet of FIG. 4, the operation of this embodiment will be described in more detail.

First, the controller section 13 fixes the switch 8 in the initial state i.e. on the side of the first power source 9 (step S1). Then the controller section 13 tries to receive a periodic radio signal i.e. a calling signal (step S2).

At step S3, the controller section 13 judges whether or not it is possible to recognize a calling signal (or extract an ID). If the judgment is YES, the process proceeds to step S10 and if NO, the process proceeds to step S4.

At step S4, the controller section 13 judges whether or not the switch 8 is switched to the side of the second power source 10. If the judgment is YES, the process proceeds to step S8 and if NO, the process proceeds to step S5.

At step S5, the controller section 13 judges whether or not recognition of a calling signal has been impossible for two consecutive times. If the judgment is YES, the process proceeds to step S6 and if NO, the process proceeds to step S10.

At step S6, the controller section 13 sends a control signal to the switch 8 and the switch 8 is switched to the side of the second power source 10. By this switching, power source voltage of the frequency converter circuit 4 is raised and the signal distortion is thereby eliminated.

At step S7, the controller section 13 judges whether or not it is possible to recognize a calling signal (or extract an ID). If the judgment is YES, the process proceeds to step S10 and if NO, the process proceeds to step S8.

At step S8, the above judgment is repeated until predetermined time elapses, and then the switch 8 is returned to the initial state by the controller section 13 at step S9.

At step S10, the controller section 13 judges whether or not the recognized calling signal is sent to the ID of the pager itself. If the judgment is YES, the informing section 14 informs the user of reception of calling at step S11, and if NO, the process returns to the step S2.

Figure 5:
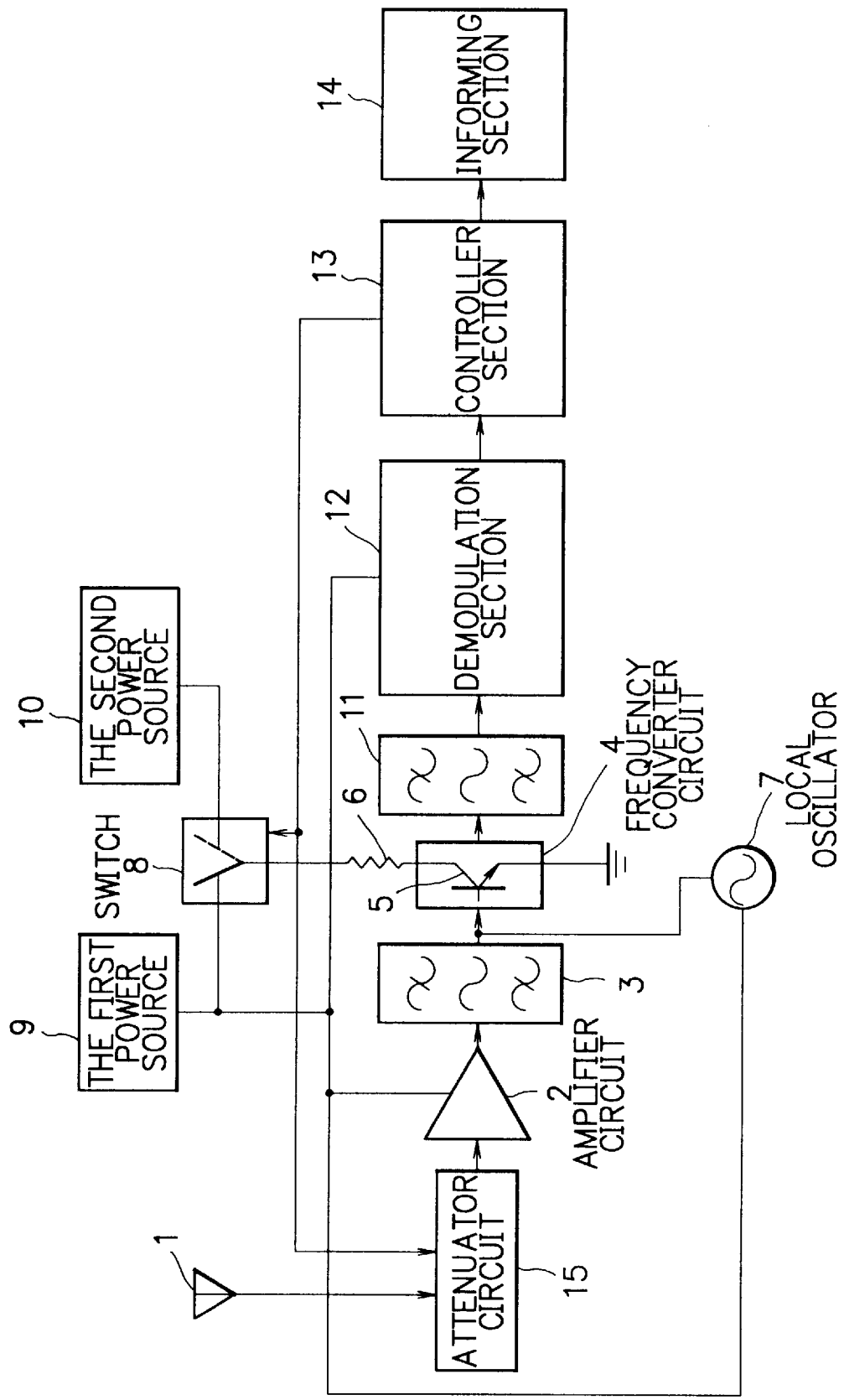
FIG. 5 is a block diagram of another embodiment of the present invention.

Next, FIG. 5 shows another embodiment of the present invention. The pager of this second embodiment further comprises an attenuator circuit 15 between the antenna 1 and the amplifier circuit 2. The attenuator circuit 15 works in the same way as the attenuator circuit 102 in the aforementioned conventional pager. According to this embodiment, intermodulation is eliminated more effectively and the possibility of reception is improved better, since the interfering components of the adjacent unnecessary waves are attenuated out of the receivable gain range by the attenuator circuit 15 and intermodulation in the frequency converter circuit 4 is also eliminated by the switching of the switch 8.

Figure 6:
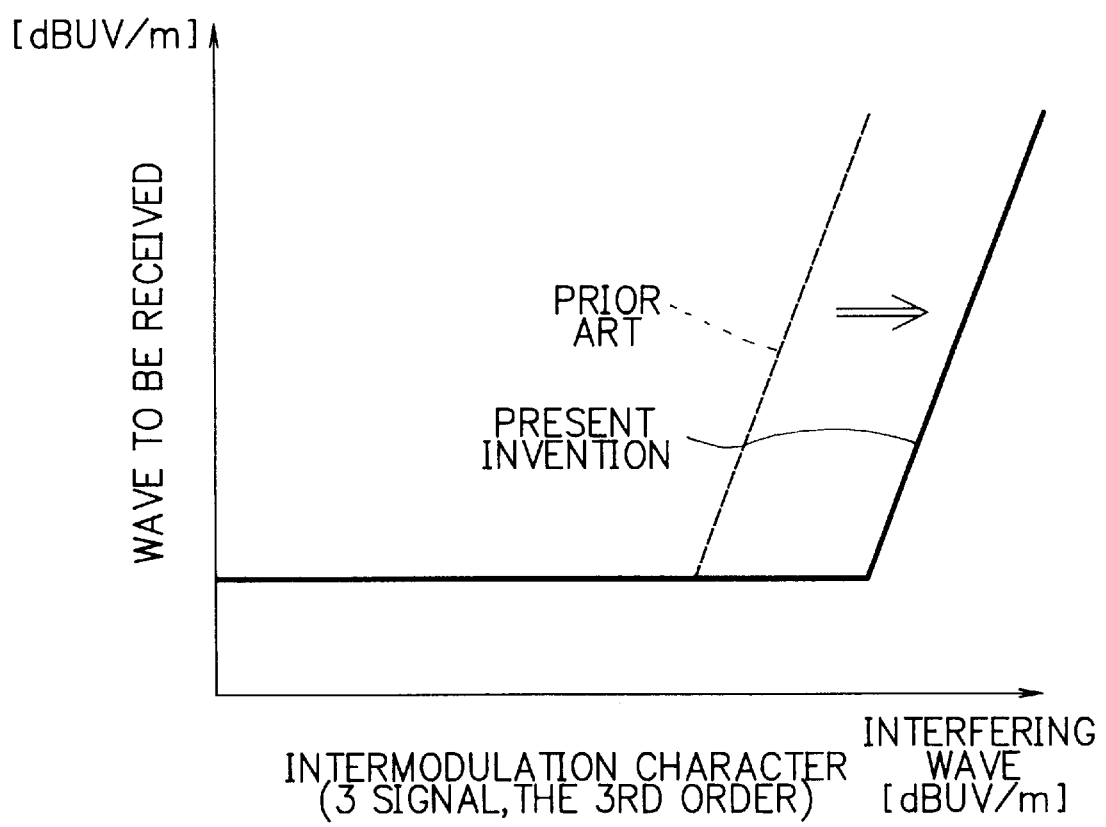
FIG. 6 is a graphical representation conceptually showing the improvement of intermodulation character by the present invention.

FIG. 6 conceptually shows the improvement of intermodulation character (3 signals, the 3rd order) by the present invention. For each given electric field level of the signal to be received, the electric field level of the interfering wave to which intermodulation can be avoided is raised, in other words, the interference is eliminated.

Incidentally, though two power sources are provided for the frequency converter circuit 4 in the embodiments shown above, the total number of the power sources for the frequency converter circuit 4 of the present invention is not limited. More than three power sources and a switch 8 of suitable construction may be provided, and an appropriate voltage can be selected according to degree of intermodulation. In this embodiment, when recognition of a calling signal (or extracting an ID) from the output of the demodulation section 12 is impossible, the controller section 13 switches the position of the switch 8 gradually into higher voltage position until signal distortion in the frequency converter circuit 4 disappears and the recognition of a calling signal becomes possible. After a predetermined time from the switching into higher voltage position, the controller section 13 may return the switch 8 into the initial state i.e. the lowest voltage position and save power consumption of the pager.

Moreover, another switching operation is also possible, the controller section 13 may switch the position of the switch 8 gradually into lower voltage position as long as recognition of a calling signal or extraction of an ID is possible. Saving power consumption of the pager is also possible according to this embodiment.

In addition, embodiments of the present invention can be applied to a pager comprising a frequency converter circuit 4 in which FETs are used instead of transistors.

As set forth hereinabove, in the pager according to the present invention, signal distortion in the frequency converter circuit, a factor causing intermodulation, is prevented by switching power source voltage (operating voltage) of the frequency converter circuit, and thereby the intermodulation is eliminated. Therefore, even when radio waves of strong electric fields are inputted into the pager, deterioration of reception possibility due to intermodulation in the frequency converter circuit is prevented.

Moreover, possibility of receiving calling signals is always monitored and the switching of the power source voltage into higher voltage is executed only when recognition of a calling signal or extracting an ID is impossible, and the switch is returned to initial state after predetermined time.

Therefore, saving power consumption of the pager along with preventing deterioration of reception possibility due to intermodulation is made possible. Possibility of reception is improved still better if the attenuator circuit is provided in front of the amplifier circuit.

While the present invention has been descrived with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pager comprising:

an amplifier means for amplifying a radio signal received by an antenna;

a frequency converter means for converting the frequency of the radio signal into an intermediate frequency;

a demodulation means for demodulating the signal of intermediate frequency;

an informing means for informing the user of receipt of a call when the ID extracted from the demodulated signal is the ID of the pager itself;

a power supply means for supplying plural power sources of various voltages;

a switching means for selecting a power source supplied by the power supply means and supplying the power source to the frequency converter means; and a controller means for shifting the selection of the switching means into another power source of higher voltage when the extraction of an ID from the demodulated signal is impossible.

2. A pager as claimed in claim 1, wherein the controller means instructs the switching means to select a power source of the lowest voltage in the initial state and after a predeterimined time from the switching into a higher voltage power source.

3. A pager as claimed in claim 1, wherein the controller means instructs the switching means to select a power source of lower voltage as long as the extraction of an ID from the demodulated signal is possible.

4. A pager as claimed in claim 1, further comprising an attenuator means which is capable of attenuating reception gain in front of the amplifier means when the extraction of an ID from the demodulated signal is impossible.

5. A pager comprising:

an amplifier that amplifies a radio signal received by an antenna;

a frequency converter that converts the frequency of the radio signal into an intermediate frequency;

a demodulator that demodulates the signal of intermediate frequency;

an informing circuit that informs a user of receipt of a call when an ID extracted from the demodulated signal is the ID of the pager itself;

a power supply that supplies a plurality of power sources of various voltages;

a switch that selects a power source supplied by the power supply and supplies the power source to the frequency converter; and a controller that shifts the selection of the switch into another power source of higher voltage when the extraction of an ID from the demodulated signal is impossible.

6. A pager as claimed in claim 5, wherein the controller instructs the switch to select a power source of the lowest voltage in the initial state and after a predetermined time from the switching into a higher voltage power source.

7. A pager as claimed in claim 5, wherein the controller instructs the switch to select a power source of lower voltage as long as the extraction of an ID from the demodulated signal is possible.

8. A pager as claimed in claim 5, further comprising an attenuator which is capable of attenuating reception gain in front of the amplifier when the extraction of an ID from the demodulated signal is impossible.

* * * * *